US005666499A

United States Patent [19]
Baudel et al.

[11] Patent Number: 5,666,499
[45] Date of Patent: Sep. 9, 1997

[54] CLICKAROUND TOOL-BASED GRAPHICAL INTERFACE WITH TWO CURSORS

[75] Inventors: Thomas Baudel; William A. S. Buxton; George W. Fitzmaurice; Beverly L. Harrison; Gordon P. Kurtenbach; Russell N. Owen, all of Toronto, Canada

[73] Assignee: Silicon Graphics, Inc., Mountainview, Calif.

[21] Appl. No.: 511,303

[22] Filed: Aug. 4, 1995

[51] Int. Cl.$^6$ ........................... G06F 3/00
[52] U.S. Cl. ............... 345/347; 345/352; 345/157; 345/146
[58] Field of Search .................. 345/145–146, 345/156–167, 173–183, 117–120; 395/155–161

[56] References Cited

U.S. PATENT DOCUMENTS

| | | | |
|---|---|---|---|
| 5,198,802 | 3/1993 | Bertram et al. | 345/146 |
| 5,300,927 | 4/1994 | Arai et al. | 345/157 |
| 5,421,590 | 6/1995 | Robbins | 345/162 |
| 5,442,788 | 8/1995 | Bier | 395/344 X |
| 5,477,237 | 12/1995 | Parks | 345/156 |
| 5,548,304 | 8/1996 | Yoshino et al. | 345/145 |
| 5,561,811 | 10/1996 | Bier | 395/326 X |
| 5,572,238 | 11/1996 | Krivacic | 345/157 |

FOREIGN PATENT DOCUMENTS 0 635 780 A1  1/1995  European Pat. Off. ........ G06F 3/033

*Primary Examiner*—Mark R. Powell
*Assistant Examiner*—John E. Breene
*Attorney, Agent, or Firm*—Sterne, Kessler, Goldstein & Fox P.L.L.C.

[57] ABSTRACT

A graphical user interface with clickaround tools for enhanced user interaction with an application program utilizing "two-handed" techniques. The "tool-handed" technique provides two displayed cursors controlled by two distinct pointing input devices. Actuation of a secondary input device, corresponding a secondary cursor, provides a tool palette or menu near a displayed primary cursor. This technique allows a user to select and activate tools to perform substantive operations on displayed objects of the application program. The interface allows the user to invoke tools in a fluent and seamless fashion, thus maintaining the user's focus on the substantive operations and not the procedural motions of tool access.

20 Claims, 7 Drawing Sheets

CLICKAROUND TOOL-BASED GRAPHICAL INTERFACE WITH TWO CURSORS

FIELD OF THE INVENTION

The present invention relates to user interfaces. More particularly, the present invention relates to graphical user interfaces providing "two-handed" operation for enhanced user interaction.

RELATED ART

Graphical interfaces provide a gateway between users and virtually all types of interactive application programs. No longer are graphical interfaces limited to drawing or graphics application programs. Indeed, even those application programs that predominantly manipulate text (e.g., word processors) or numerical data (e.g., spreadsheet programs) use graphics extensively for visualizing and manipulating the application-specific objects.

The term graphical interface, as used herein, is not intended to narrowly denote a discrete layer of software or hardware. Rather the scope of the term is intended to encompass any combination of software techniques (implemented in an operating system (OS), a graphical user interface (GUI) layer, an application program, or any combination thereof), hardware input devices (e.g., a keyboard or a pointing device), and display devices.

For a productive user environment, a graphical interface must be easy to learn and use, while having robust functionality. The advantages and disadvantages of various graphical interfaces can be characterized on three levels: device, task, and dialogue. The device level substantially focuses on the hardware or physical characteristics (e.g., the "feel" of a mouse or the cost of a data tablet). For example, some conventional graphical interfaces have enhanced robustness by providing the user with input devices with very high degrees of freedom. One such device is the Magellan "Space Mouse" from Logitech, Inc., 6505 Kaiser Drive, Fremont, Calif. 94555-3615.

At the task level, interaction techniques are generally evaluated on an individual task basis. In essence, the technique is evaluated in isolation from other interface techniques. At the dialogue level, however, evaluations are made with respect to sequencing between interaction techniques. For example, hand movements between input devices not only distract the user, but also require time. Although the positioning is generally faster with a mouse than with cursor-control keys, cursor-control keys may be faster than a mouse if the user's hands are already on the keyboard and will need to be on the keyboard for the next task in sequence after the cursor is repositioned.

In balance, the attributes of these levels, conventional graphic interface solutions have followed several general approaches. One approach has been to provide a "two-handed" graphical interface. With such system, each hand of the user controls an input device with a medium degree of freedom. An example of this "two-handed" approach is the clickthrough interface as disclosed in European Patent Application, Publication No. 0 635 780 A1, to Xerox Corporation, filed Jul. 20, 1994, titled "User interface having clickthrough tools that can be composed with other tools" (hereinafter "Xerox" system). See also Bier et al., "A Taxonomy Of See-Through Tools," *Proceedings of C.H.I.* 1994, Apr. 24–28, 1994, pp. 358–364; Bier et al., "Toolglass And Magic Lenses: The See-Through Interface," *Proceedings of SIGGRAPH* 1993, Aug. 1–6, 1993, pp. 73–80.

While the Xerox interface does provide greater user freedom, the interface has a significant number of limitations. For example, the Xerox tool palette is permanently displayed, thus tending to hide a potion of the application data, even if partial or complete tool palette transparency is used. In addition, one of the Xerox device pointers is permanently attached to a floating palette, thus unduly restricting the user to only one technique of tool selection. Moreover, the clickthrough selection requires that the user align a pointer with the data or objects to be manipulated and requires transparent or semi-transparent tool palettes.

SUMMARY OF THE INVENTION

The clickaround tool-based graphical user interface of the present invention provides for enhanced user interaction with application programs. In general, the present invention utilizes versatile "two-handed" techniques for tool selection and activation allowing the user to fluently and seamlessly move throughout the interface. As a result, the user can focus on performing substantive operations on displayed objects and is not unduly distracted by the procedural motions of tool access.

One feature of the interface is that it promotes the same type of hand cooperation the user performs in the everyday world. That is, the dominant hand of the user is mainly be used to control tools (e.g., paint brushes), while the non-dominant hand is predominantly used to control tool selection.

Another feature of the invention is that the techniques are designed to maintain the user's hand in a "nearly home position" for the most common operations. As such, each operation is near at hand, as opposed to the more common situation where each change of operation involves relatively significant hand movements and actions in selecting from menus positioned on the periphery of the screen.

Another significant feature of the present invention is "in situ" pop-up tool palettes. That is, tool palettes only appear on the screen when desired, and are automatically displayed near the user's activity. Correspondingly, the user's focus is maintained on the area of interest.

Still a further feature the present invention is that the clickaround paradigm which allows for both dominant hand tool activation and non-dominant or "gear-shift" tool activation. Thus, providing the user with two degrees of freedom for tool selection.

The foregoing and other features and advantages of the invention will be apparent from the following, more particular description of the preferred embodiments of the invention, as illustrated in the accompanying drawings.

DETAILED DESCRIPTION OF THE PREFERRED EMBODIMENTS

The preferred embodiments of the invention are discussed in detail below. While specific model numbers and/or configurations are discussed, it should be understood that this is done for illustration purposes only. A person skilled in the relevant art will recognize that other components and configurations may be used without parting from the spirit and scope of the invention.

The preferred embodiments of the invention are now described with reference to the figures where like reference numbers indicate like elements. Also in the figures, the left most digit of each reference number corresponds to the figure in which the reference number is first used.

Figure 1:
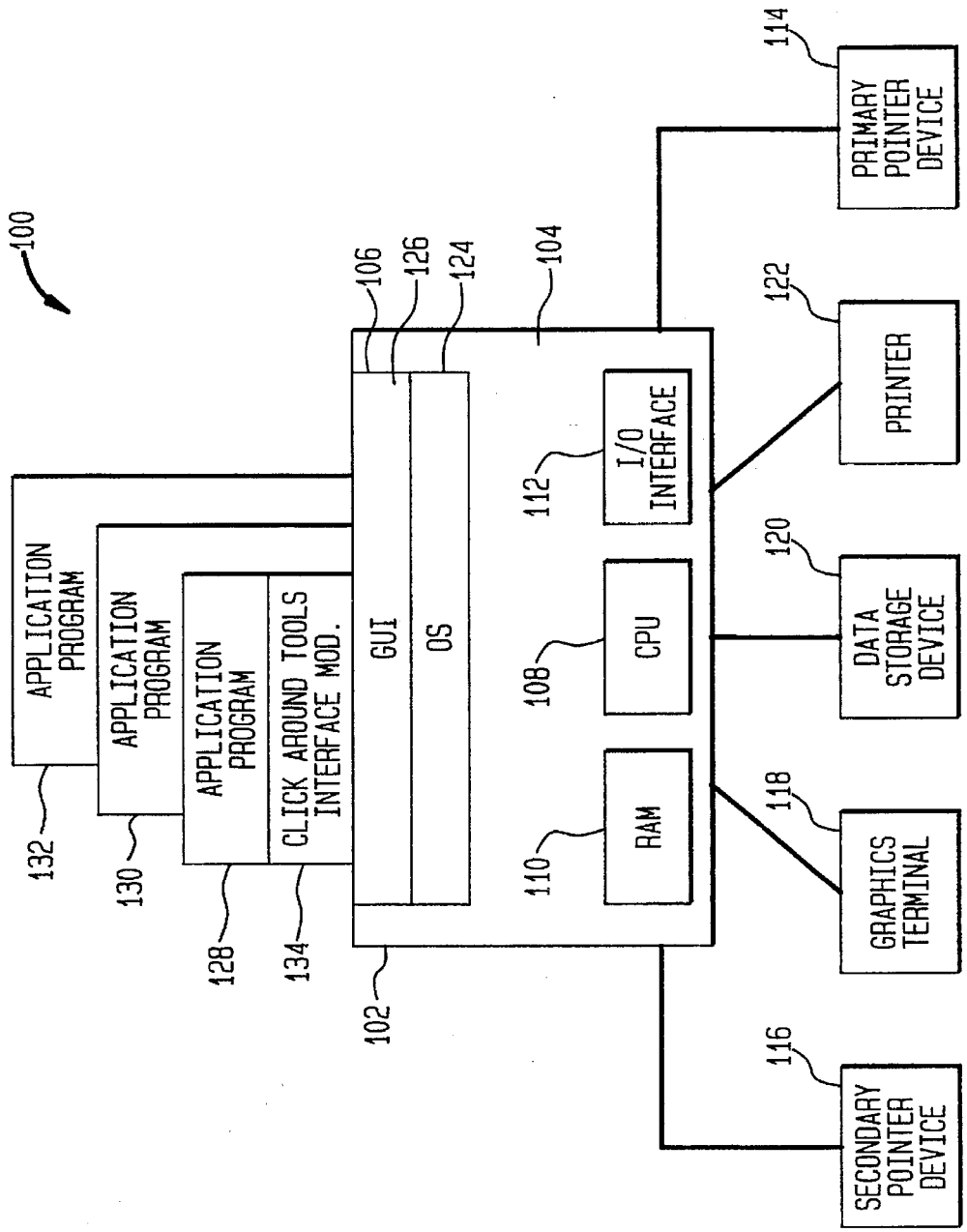
FIG. 1 illustrates a general hardware/software environment of the present invention.

FIG. 1 illustrates a general hardware/software environment 100 in which a preferred embodiment of the present invention can operate. Environment 100 includes a computer platform 102 having a hardware unit 104 and software unit 106. Hardware unit 104 includes a central processing unit (CPU) 108, a random access memory (RAM) 110, and an input/output (I/O) interface 112.

While any personal computer, workstation, or mainframe computer can be utilized with the present invention, in this preferred embodiment, hardware unit 104 is either a Silicon Graphics Workstation, Model Indy, Indigo$^2$ or Onyx, manufactured by Silicon Graphics Incorporated (SGI), 2011 North Shoreline Boulevard, Mountain View, Calif., 94039-7311. As such, CPU 108 is a processor from the MIPS family of processors including processors from the R4000 or R8x00 family.

Hardware unit 104 is also operably connected to a number of peripheral devices including a primary pointer device 114, a secondary pointer device 116, a graphics terminal 118, a data storage device 120, and a printer 122. Various other peripheral devices that typically interface with a computer can also be connected with hardware unit 104.

In this preferred embodiment, primary and secondary pointer devices 114, 116 are functioning with a Wacom tablet (e.g., Model UD1212R or UD1218) manufactured by Wacom Technology Corporation, 501 S.E. Columbia Shores Blvd., Suite 300, Vancouver, Wash. 98661. Primary pointer device 114 is a Wacom stylus, Model up-701E OOOH, although any other compatible stylus can be used with the invention. Secondary pointer device 116 is a Wacom 4-button puck, Model UC-410-11, or any other compatible device. Another embodiment of the present invention uses an SGI mouse, Model S100 (standard mouse provided by SGI), as secondary pointer device 116.

As will be discussed below in further detail, a user of the preferred embodiment of the present invention provides relatively precise positioning with primary pointer device 114 which is controlled by the user's dominant hand (for right-handed people this is their right hand). The user's non-dominant hand is used to control secondary pointer device 116 for more coarse positioning tasks. As such, it is generally preferred to use a stylus rather than a mouse for primary pointer device 114. However, any conventional mouse, joystick, puck, or track ball with similar features can be used for either primary or secondary pointer devices 114, 116.

Software unit 106 includes an operating system (OS) 124 and a graphical user interface (GUI) 126 which is compatible with hardware unit 104. In this preferred embodiment, OS 124 is an IRIX operating system version 5.3 or greater and GUI 126 is an X11 interface, version 6, both of which are available from SGI.

Environment 100 further includes a number of application programs 128, 130, and 132 layered over software unit 106. In general, the user physically interacts with computer platform 102, via primary and secondary pointing devices 114, 116, to facilitate the features of application programs 128, 130, and 132. For example, in this preferred embodiment, application program 128 is StudioPaint 3.0, beta version, from Alias/Wavefront, 110 Richmond Street East, Toronto, Ontario, Canada MSC 1P1. Application program 128, in conjunction with OS 124 and GUI 126, handles user inputs from primary and secondary pointer devices 114, 116. Application program 128 also outputs a series of graphic commands to facilitate the representations (i.e., detailed geometric descriptions and attributes) of data/objects displayed on graphics terminal 118. In this preferred embodiment, the invention is implemented as several clickaround tools interface modules 134, which are incorporated into application program 128. As would be apparent to a person skilled in the relevant art, however, the invention can alternatively be incorporated into any operating system (e.g., OS 124) or graphical user interface (e.g., GUI 126), thereby providing the features of the invention across a plurality of application programs (e.g., application programs 128, 130, and 132). Similarly, the present invention also can be implemented in hardware unit 104 (e.g., as a finite-state machine).

In general, the present invention provides fluent and seamless techniques for invoking and selecting tools of an application and GUI programs, for example. Since application program 128 in this preferred embodiment is Alias StudioPaint, the present invention enhances the user's access to tools for creating, copying, modifying objects, and tools for deleting existing objects.

Figure 3:
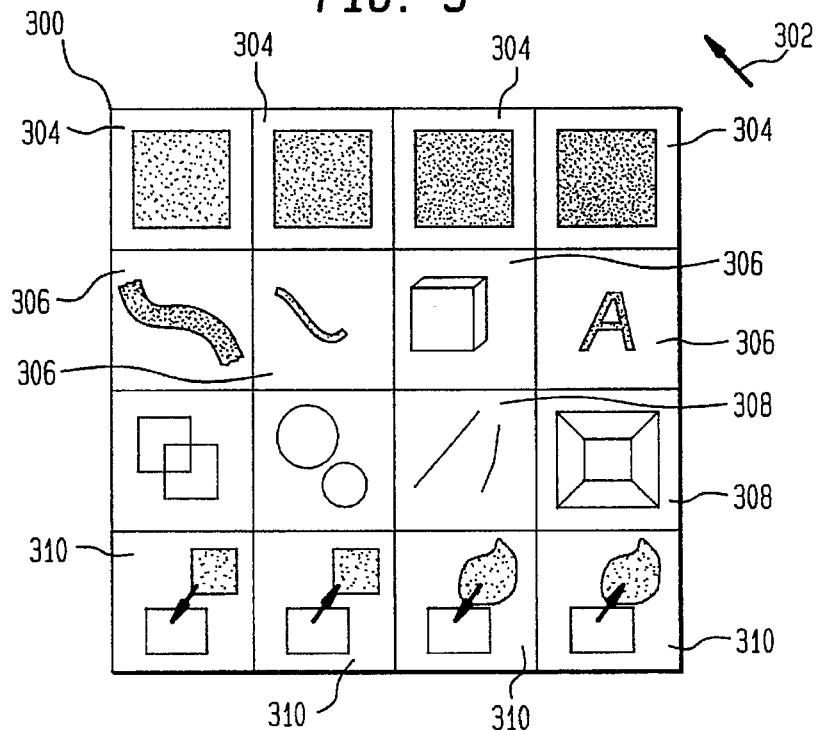
FIG. 3 illustrates a tool palette with tool exemplars.

FIG. 3 illustrates a tool palette 300. A palette area (or tool window) presents a set of non-overlapping representations of tools to the user on the screen of the graphics terminal 118. With the present invention, tool palettes can either be opaque or semi-transparent. A tool is depicted with text and/or an image (e.g., icon), as shown in FIG. 3. In addition, there are various types of tools. For example, tools 304 are color selectors and when selected change the current editing color of the user's current tool. Similarly, tools 306 are tool selectors that, when activated, change the attribute of the user's current tool (e.g., varying the size of a paint brush). Tools 308 are "two-handed" tool selectors that when activated start a "two-handed" operation (e.g., creation of a rectangle, circle, or line). Tools 310 are "full" clickaround tools. That is, tool 310 (e.g., "apply color", "pick color", "copy shape", or "paste shape") when activated with a user's non-dominant hand performs its function on an application area (not shown) or an object (not shown) designated with a primary cursor 302 which is controlled by the user's dominant hand.

As will be apparent by the discussion below, a predominant feature of the invention is its conformity with how the user works cooperatively with both hands in the everyday world or "real domain." That is, the user's dominant hand is mainly used to control a primary cursor or tools, such as paint brushes, while the user's non-dominant hand is generally used to control tool palettes. As such, the user works in a "virtual domain" in a manner that closely mimics in actual actions the "real domain."

For example, physically writing on a piece of paper can be accomplished noticeably faster when the writer holds the paper in place with the non-writing hand. Similarly, the invention achieves enhanced user interaction times and helps maintain a high level of user focus. That is, the clickaround paradigms of the present invention allow the user to focus on substantive tasks/operations, rather than the procedural aspects, such as tool selection. Correspondingly, the user's hands are generally in a "nearly home position"

for the most common operations with the present invention. That is, each operation is designed to be near at hand, as opposed to the more common situation where each change of operation involves relatively large amounts of hand movement and action, in order to select from menus around the screen, for example.

While the invention is specifically tailored to be an extension of the user's "two-hand" interaction in the "real domain," the invention also degrades nicely back into a conventional single pointer or keyboard-based interactive system, if so desired by the user.

Figure 2:
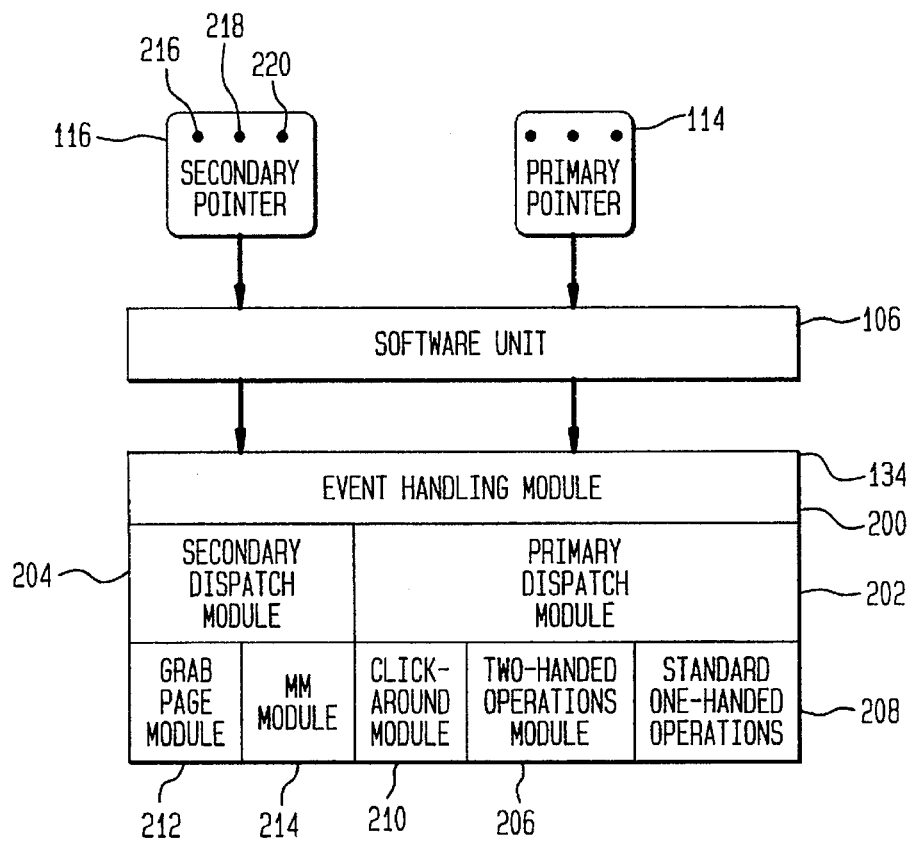
FIG. 2 illustrates a functional block diagram of the present invention.

FIG. 2 illustrates a detailed functional block diagram of the present invention. Clickaround tools interface modules 134 includes a main application event handling module 200, a primary dispatch module 202, and a secondary pointer dispatch module 204. Interfaced with primary dispatch module 202 is a "two-handed" operations module 206 and a "one-handed" operations module 208. Secondary pointer dispatch module 204 interfaces with a clickaround module 210, a grab page module 212, and a marking menu module 214. These modules work in concert with each other to provide the features of the present invention.

The preferred embodiment is now characterized with respect to three buttons on secondary pointer device 116. These buttons include a menu button 216, a grab page button 218, and a marking menu button 220. For each, a detailed description of the behavior functionality of the features is provided with a pseudo code description of each feature.

Menu Button

The menu button feature of the present invention provides the feature of "in situ" pop-up tool palettes. When menu button 216 is depressed, a tool palette pops up on the screen of graphics terminal 118 near the cursor (primary cursor) controlled by primary pointer device 114. Hence, the tool palette appears "in situ" (in position) or near the user's activity. Correspondingly, the user focus of attention is maintained on the area of interest. The pop-up tool palette is displayed only as long as menu button 216 is held down.

Figure 4A:
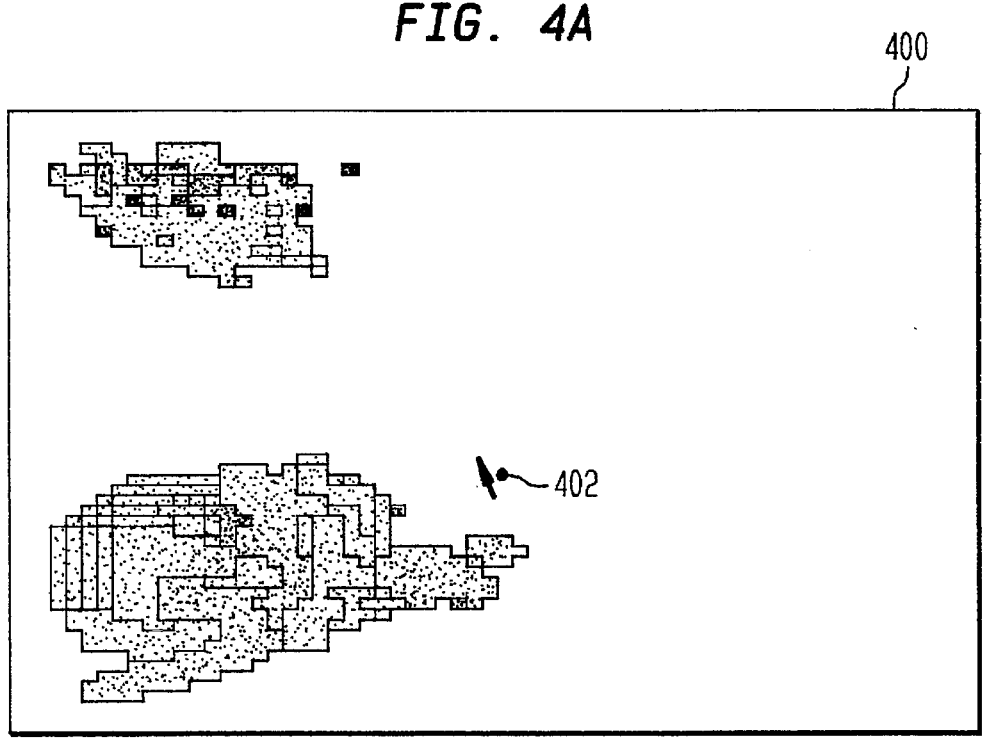
FIGS. 4(a)–(b) illustrate an "in situ" pop-up tool palette.
Figure 4B:
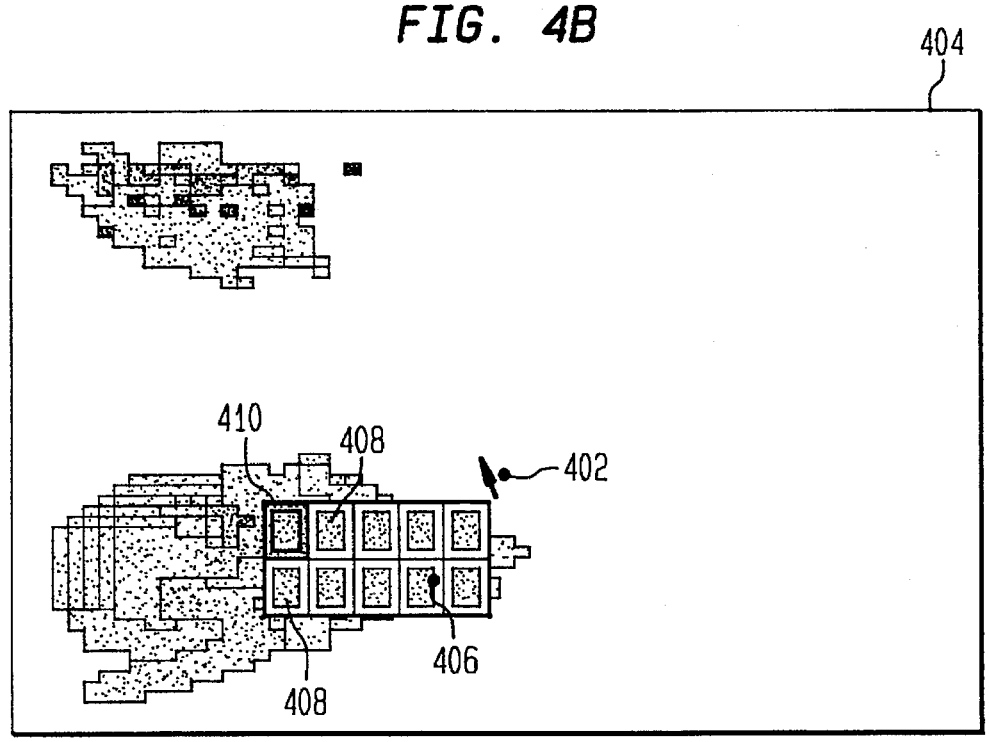

FIGS. 4(a)–(b) illustrate this feature of the present invention. FIG. 4(a) illustrates a main application area 400 with only data and a primary cursor 402 (i.e., cursor controlled by primary pointer device 114) being shown on the display of graphics terminal 118. FIG. 4(b) illustrates a main application area 404, after the user has depressed menu button 216. As shown, an overlay tool palette 406 is revealed at the current location of primary cursor 402 of the current tool. Individual tools are visually represented as rectangular icons 408. A secondary cursor 410 (i.e., cursor controlled by secondary pointer device 116) is displayed on tool palette 406 highlighting a selected tool. In the preferred embodiment, the secondary cursor 410 is a "block highlighting" cursor, constrained to being positioned on the bounding box of the currently selected tool on the tool palette. If no tool is selected, then it appears as a conventional cross cursor. An unconstrained cursor (such as a tracking cross) could also be used but may provide inferior interaction.

The location of tool palette 406 is actually a slight offset from the primary cursor 402. In this embodiment, the tool palette always pops up approximately 1 centimeter (cm) below the current position of the primary cursor to avoid obscuring the object currently pointed at with the primary cursor. However, the offset can be user definable, in a profile, for example.

In addition, the present invention automatically adjusts for right and left handed users. That is, the side of the primary cursor in which the tool palette is displayed is governed by the relative position of the secondary cursor. For example, if the secondary cursor is at the left of the primary cursor, then the palette displayed (with the appropriate offset) to the left of the primary cursor. Similarly, if the secondary cursor is to the right of the primary cursor, then the tool palette is positioned to the right of the primary cursor. As such, the invention grants the user convenient access to the tool palette without impeding on the user's activities.

When menu button 216 is released, the tool palette disappears, leaving the area of interest clear and entirely devoted to the application data, thereby preserving screen estate. If no new selection is made, the previous or default tool selection is highlighted by the secondary cursor.

Moreover, the present invention allows the user to keep both hands on their home positions (i.e., on primary and secondary pointer devices 114, 116). As such, once a selection is made, the user is always posed for fluent and seamless transitions to the next action or the use of the selected tool. For example, assume the present is integrated into a graphics program, and the user desires to draw a rubber-band line. Since both hands, at the moment of menu selection, are in position for the selected tool, as soon as the user makes the tool selection, the user's hands are immediately transformed into the home position to do a "two-handed" version of that rubber-band line with one hand attached to right end of the rubber band, and the other hand attached left end of the rubber-band. Thus, the user is provided immediate mobility. Furthermore, at the moment the user is finished with the drawing action, both hands are immediately in home position to bring up the tool. On the other hand, conventional GUIs (e.g., with a puck and a keyboard) require continuous repositioning of the user's hands to achieve the same function (i.e., move one hand between the puck and the function keys or hot keys).

While conventional function keys or hot keys can also be used to invoke tool palettes, menu button 216 in effect attaches the tool palette to a mobile device (i.e., primary pointing device 114) which is a fundamental aspect of the clickaround paradigm of the present invention. That is, the user can select, in a single action, both the tool (with the non-dominant hand) and the object on which it is to be operated (with the dominant hand).

Correspondingly, the user has two general techniques for selecting a tool once the palette is exposed, referred to as dominant hand tool activation and non-dominant or "gearshift" tool activation. Thus, the present invention provides the user with two degrees of freedom.

Figure 5A:
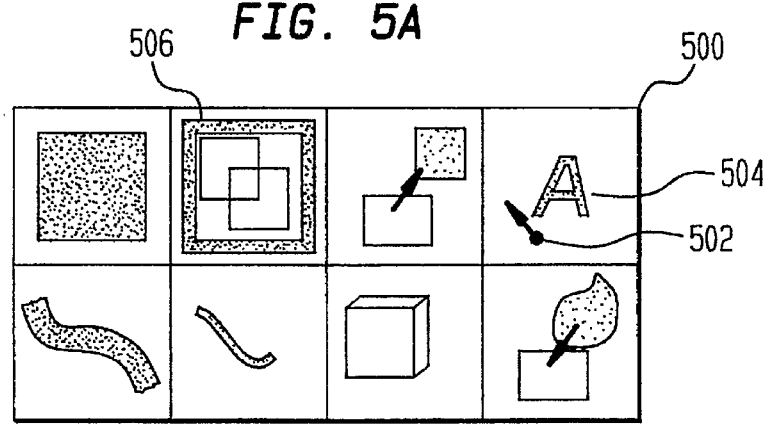
FIGS. 5(a)–(c) illustrate dominant hand tool activation.
Figure 5B:
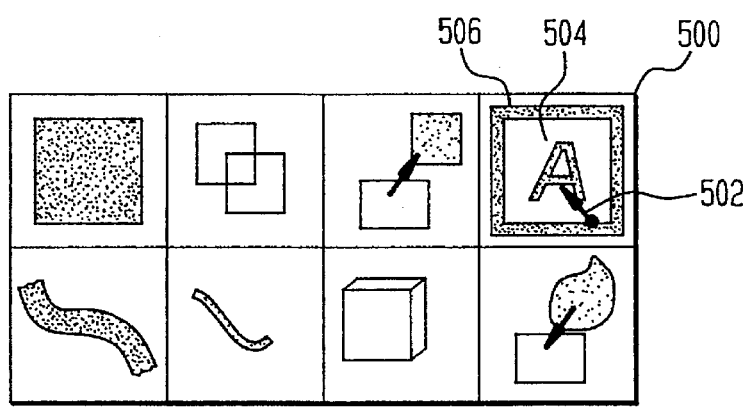
Figure 5C:
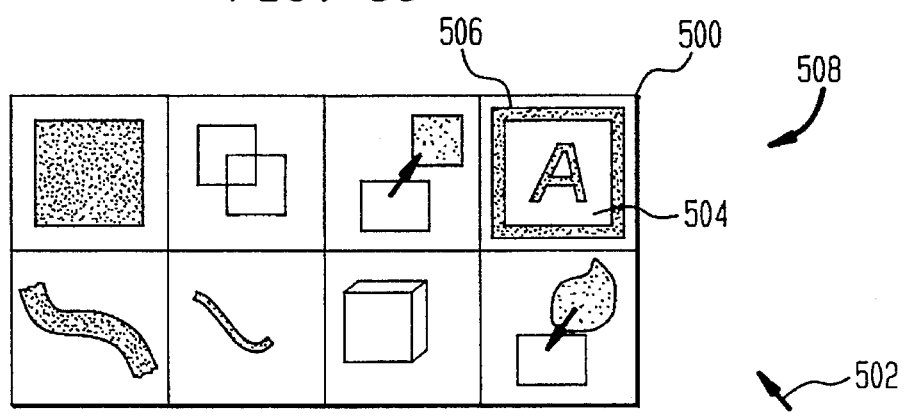

FIGS. 5(a)–(c) illustrate dominant hand tool activation, which provides the user with a familiar selection technique found in several GUIs. FIG. 5(a) depicts a tool palette 500 displayed as a result of the user pressing and holding down menu button 216. Primary cursor 502 is then moved over a desired tool 504 (in this instance, a simple text tool) by the user. The user then depresses a button on primary pointing device 114 selecting tool 504. The tool selection is indicated displaying secondary cursor 506, as shown in FIG. 5(b). Upon the user releasing the button on primary pointer device 114, tool 504 is activated.

Since a text tool was selected, in this illustration, the user then can move primary cursor 502 into a main application area 508 to enter text, as shown in FIG. 5(c). Upon releasing the menu button 216, tool palette 500 disappears (not shown).

Figure 6A:
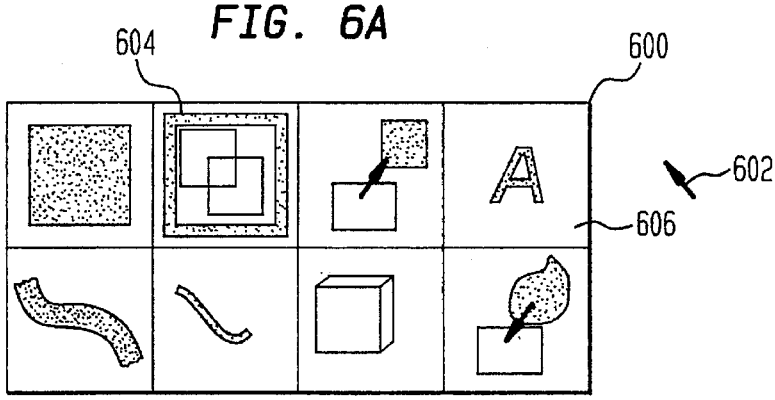
FIGS. 6(a)–(e) illustrate non-dominant or "gear-shift" tool activation.
Figure 6B:
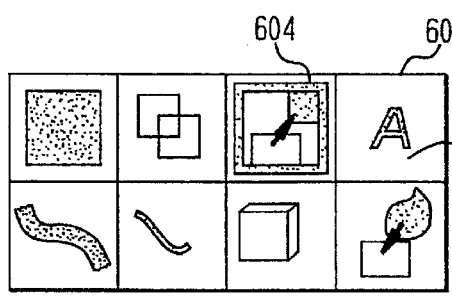
Figure 6C:
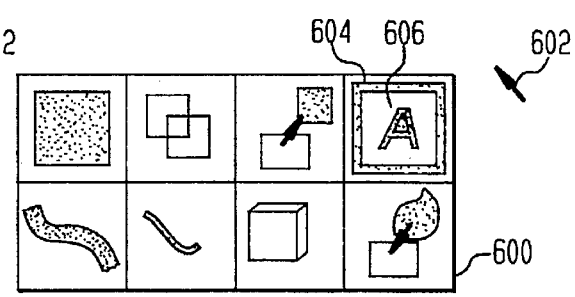
Figure 6D:
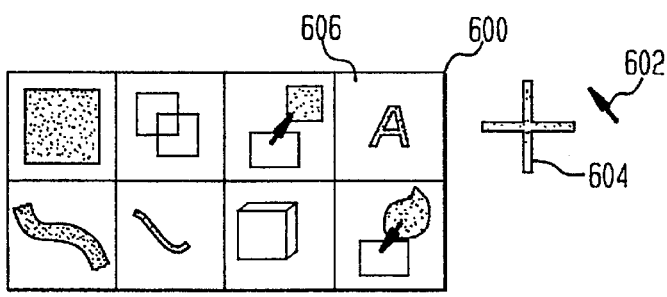
Figure 6E:

FIGS. 6(a)–(e) illustrate non-dominant hand or "gearshift" tool activation. As with dominant hand tool activation, the user also displays a tool palette 600 by depressing menu button 216. However, by moving (e.g., in a "gear-shift" or up/down fashion) the secondary pointer device 116 with the non-dominant hand, a tool selection is made without diverting or interrupting a user's focus or dominant hand from the task in progress. As the secondary pointer device is moved, the underlying tools 606 are highlighted as secondary cursor 604 passes over each tool, as illustrated in FIGS. 6(a)–(c). If the user should move secondary pointer device 116 beyond the region of tool palette 600, a secondary cursor 604 is displayed in the form of a cross, as depicted in FIG. 6(d), a release of menu button 216 in such a position does not make a tool selection. As shown in FIG. 6(e), the release of menu button 216 activates selected tool 606 (as with respect to FIGS. 5(b)–(c), a simple text tool) and removes tool palette 600 from the screen. In addition, with both techniques when the user pops up a tool palette again, the secondary cursor remains over the last selected item, so that the user can predict where to look to find the currently selected tool.

Thus, since the selection is completely controlled with secondary pointer device 114 (non-dominant hand), the user is free to perform other functions with the primary pointer device 114 (dominant hand). Furthermore, the non-dominant hand is required to do only coarse grained movements since the tools representations are sufficiently large so that only coarse movements are required to move from tool to tool. In this preferred embodiment, the tool representations are .at usable sizes of approximately 1 cm.

For example, assume that a tool palette has five tools. Once the user presses menu button 216, a tool palette is exposed. An alternative embodiment of the present invention has a tool palette with tools located around the center of the palette, where the user can make an angular gesture (rather "gear-shift" motion) to make the selection. Conventional step-by-step techniques, in contrast, are both considerably more visually demanding and require more conscious management than those of the present invention.

Moreover, the clickaround feature has a number of significant advantages over the clickthrough paradigm described above in the Background Of The Invention section. In the clickthrough paradigm, the non-dominant hand pointer is permanently attached to a floating palette with the tool selection performed with the dominant hand only. The present invention, in contrast, allows both non-dominant and dominant hand selection. In addition, the secondary cursor of the present invention is never attached to the tool palette, allowing for greater user freedom. Furthermore, the Xerox system requires that its palettes be transparent or semi-transparent. The present invention does not have such a limitation.

Figure 7A:
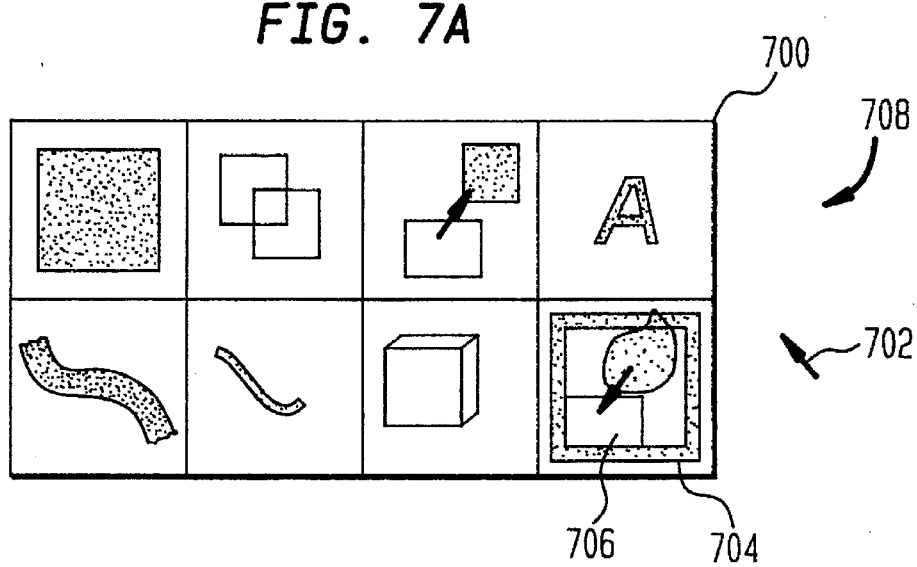
FIGS. 7(a)–(c) illustrate "full" clickaround tool activation.
Figure 7B:
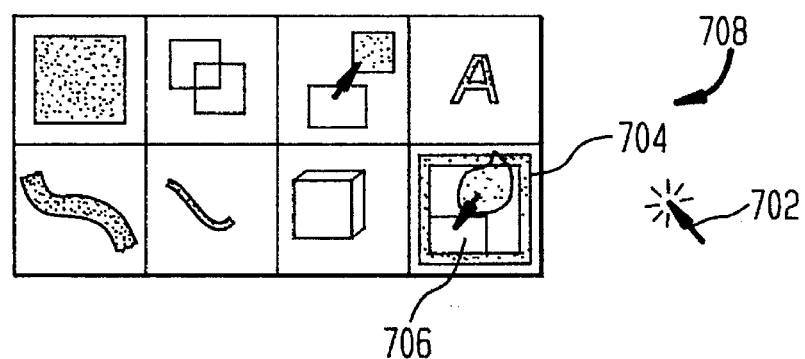
Figure 7C:
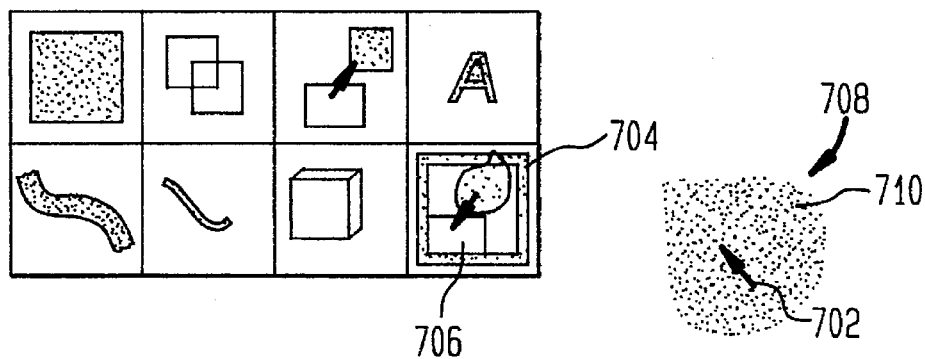

There are several other robust techniques that can be performed with the tool set of the present invention: "full" clickaround tool activation and "two-handed" stretch activation. FIGS. 7(a)–(c) illustrate "full" clickaround tool activation. After the user displays a tool palette 700 by depressing menu button 216, the user selects a desired tool 706 (in this instance, a "full" clickaround tool, "paste shape") by moving secondary pointer device 116 and highlighting tool 706 with a secondary cursor 704, as illustrated in FIG. 7(a). This selection is done while a primary cursor 702 is maintained or moved to main application area 708. As depicted in FIG. 7(b), the user then depresses a button on primary pointing device 114 and the operation corresponding to selected tool 706 is performed on the objects of main application area 708 or at that location. In this instance, a shape 710 is added to main application area 708.

Thus, "full" clickaround tool activation allows the user to use the non-dominant hand to make context selections (or choose the tool to be operated), while allowing the user to trigger the action and designate the location of the operation with the dominant hand. For instance, consider a clipboard tool on a palette. Once the clipboard tool is highlighted by the non-dominant hand, the user can select with the dominant hand (pressing a button on the primary pointer device 114) an object that is to be copied. A release of the button pastes the selected object onto the clipboard on the tool palette. A further click with the dominant hand will paste the object at the location of the primary cursor.

Figure 8A:
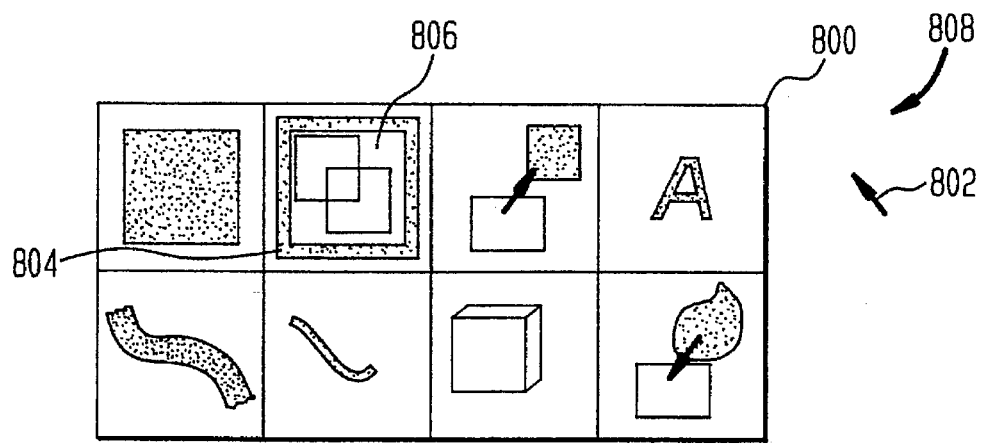
FIGS. 8(a)–(c) illustrate "two-handed" stretch activation.
Figure 8B:
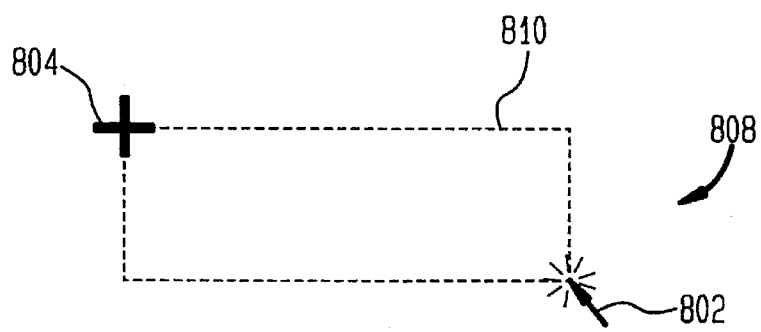
Figure 8C:
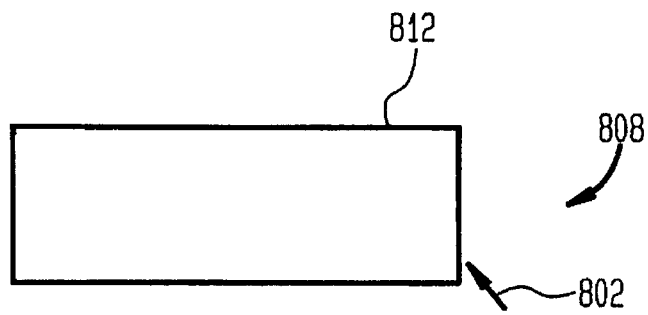

FIGS. 8(a)–(c) illustrate "two-handed" stretch activation. As with reference to FIGS. 7(a)–(c) the user selects a "full" clickaround tool 806 (in this instance, "create rectangle") from tool palette 800 with secondary pointer 116 with a primary cursor 802 remaining in a main application area 808, as in FIG. 8(a). As depicted in FIG. 8(b), the user then clicks on main application area 808 (or on selected tool 806) and tool palette 800 disappears leaving displayed a secondary cursor 804 and a "ghost shape" 810 to be created. The user then uses primary and secondary cursors 802,804 to stretch (or size) "ghost shape" 810 for its desired dimensions. When the button on the primary and secondary pointer device are released, the operation of selected tool 806 is applied to main application area 808. Thus, in this case, a rectangle 812 is created. Thus, with "two-handed" stretch activation both of the user's hands are controlling the envelope of the object, which is created once both buttons (on the primary and secondary pointer devices 114, 116) have been released.

Furthermore the present invention provides audio feedback to enhance motor feedback. Tool selection is assisted by issuing a short audible sound each time the non-dominant hand cursor goes from one tool to another. Hence, if the user knows the tools layout, the user can move from one tool to another and make the selection without looking (hence, no de-focusing by the user). Furthermore, selection can be done before the palette pops-up, again, allowing faster interaction. Since the user's attention should not be focused on sound (i.e., non disruptive) and "unconsciously" used, the preferred embodiment uses two brief, 80 millisecond (ms) sounds; one sound is emitted when the primary/secondary cursor enters a tool area and with tool selection; another sound is emitted when the primary/secondary cursor leaves the tool palette, thereby indicating tool selection cannot be realized with further movement in that direction (as shown in FIG. 6(d)).

Another feature of the present invention is a "leap-frog" menu. Whenever the tool palette is displayed and the non-dominant cursor moves too far away from the palette, then the palette will "jump" toward the cursor in one single leap (not continuously). This feature has two advantages. It allows less travel when the non-dominant hand moves too far away from the palette, and the palette can be moved away from the zone of attention if it obscures some portion of the interesting data.

Grab Page Button

When the user depresses grab page button 218 on secondary pointer device 116, the device "attaches" to the displayed page. While, and only while, grab page button 218 is held down, movement of secondary pointer device 116 "drags" or "navigates" the page along. Thus, when the underlying document of application program 128 is too large to be entirely visible in the screen of graphics terminal 118, this feature allows a simple and convenient technique allows the user to control which part of the document is exposed.

This feature provides an alternative to the far more awkward yet common technique of conventional GUIs, where moving the page is accomplished through the use of scroll bars and arrows typically located at border of the screen or window. Other conventional GUIs also provide cumbersome drag-page functions. Such conventional functions have generally been implemented by using the same pointing device (correspondingly the same hand) as is used to perform operations in the main application area. That is, to move a page, the user is required first to select the grab-page tool (typically represented as a "hand" icon) on a displayed or nested palette or menu and reposition to page. In order to resume working, the user must reacquire or reactivate the original tool that was in use prior to the repositioning.

The grab page feature of the present invention, in contrast, more closely emulates the real-world situations where a person holds a work piece with one hand and a pencil in the other. Thus, the person can easily and immediately move the page to the most comfortable and desirable position as the person performs tasks. That is, the user can immediately position to grab the page, in a motion similar to the way the user would naturally use the non-dominant hand while still holding a paint brush tool, for example, in the dominant hand.

Marking Menu Button

When marking menu button 220 on secondary pointer device 116 is depressed, the outputs of primary pointer device 114 are interpreted as the signals to control a marking menu. For example, when the user is painting, primary pointer device or stylus 114, in the dominant hand, controls a paint brush tool. As the user engages the stylus with the tablet, the user lays down "digital ink" or paint on the art work. When marking menu button 220 is depressed, while it is held down, the output of the stylus is no longer interpreted as paint. Rather, each stroke or movement of the stylus is interpreted as a short-hand command. For example, in the preferred embodiment, if the user pushes the stylus down on the tablet and waits, a radial menu pops up on the screen of graphical terminal 118. The user can make a tool selection from this menu.

Thus, marking menu button 220 allows the user to access commands and the tool palette without having the palette pop up or having to go to the margins of a screen, which is particularly advantageous with large screen displays. The combination of the menu and marking menu buttons 216, 220 provides the user with an extremely rich vocabulary of interactive features.

Implementation of the Clickaround Tool Interface Modules

The following sections delineate (in pseudo code) the interface modules of the present invention, as described in this preferred embodiment. While the material aspects of the underlying pseudo code are included, those routine aspects are not included in the following sections. A detailed description of GUI programming technique, however, is provided in "Computer Graphics: Principles and Practice, Second Edition," Foley, vanDam, Feiner, and Hugh, Second Edition, 1993, which is hereby incorporated by reference.

In general, clickaround tools interface modules 134 are implemented as an event driven modules of application program 128. An event is a state of change in primary or secondary pointer devices 114, 116 triggered by user action, such as the user depressing menu button 216. Upon receiving and processing inputs from primary and secondary pointer devices 114,116, clickaround tools interface modules 134 facilitate operations as defined by application program 128.

Pseudo Code Global Variables

The following global variables are used in the following sections:

Event: holds the latest information on the user's activity sent by the computer platform 102 and provides the following information in conventional operating systems, such as OS 124 and GUI 126:
1. if the device is activated, such as primary pointer and secondary pointer devices 114, 116, or any other input device connect with hardware unit 104, such as a keyboard or rotary dials;
2. if the device activated is a pointer device, the position of the pointer (i.e., the location the user moved the pointer, relative to the screen location), which is typically transmitted as a pair of coordinates (x, y), indicating the abscissa and the ordinate of the pointer location on the screen of graphics terminal 118; and
3. if it is a pointer or a keyboard, which buttons (or keys) are depressed.

grab_going_on, clickaround_going_on, and mm_going_on: are boolean variables.

grab_origin and grab_origin_m (x coordinate, y coordinate): represent positions.

x_m, y_m, x_s, and y_s: store coordinate information.

b_m and b_s: store button information (e.g., which buttons of a given device are depressed and which are not depressed).

current_tool: indicates the tool implemented in the application program 8.

Pseudo-code for the Main Application Event Handling Routine

This routine constitutes the main application routine, that repeatedly polls the operating system for the last event produced by the user and handles it. Most applications featuring a GUI on a major software platform have a routine of this kind. In particular, Events coming from secondary pointer device 116 are separately handled in a special routine (called "Secondary Dispatch Routine"). In addition, to facilitate "two-handed" operations, the state of both primary and secondary pointer devices 114, 116 is stored each time the devices are moved. That is to say, if the most recent event comes from primary pointer device 114, positional information regarding secondary pointer device 116 can be accessed from (x_s, y_s), and vice versa.

The pseudo code for the Main Application Event handling routine includes:

```
Repeat
  get Event from System
  if Event comes from Secondary Pointer
    put buttons state of Secondary pointer into b_s
    put position of Secondary Pointer into (x_s, y_s)
    call Secondary Pointer Dispatch routine
  else if Event comes from Primary Pointer
    put buttons state of Primary pointer into b_m
    put position of Primary Pointer into (x_m,y_m)
    call Primary Pointer Dispatch routine
``` else call Other dispatch routine
End Repeat
get Event: standard routine to get the last event produced by the user. This is provided by the operating system on most platforms that provide a GUI.
Other dispatch routine: performs any operation relative to the most recent action of the user, not related to the activation of the primary or secondary pointer devices 114, 116.

Pseudo-code for Secondary Pointer Dispatch routine

This routine constitutes the core of module that handles the secondary pointer device 116. The module tests which buttons user depressed and activates the module corresponding to the appropriate button.

In the preferred embodiment, grab button 218 is linked to the grab the page/zoom module, as shown below. While grab button 218 is depressed, the module keeps track of the movements of secondary pointer device 116 and scrolls by a proportional amount. If both primary and secondary pointer devices have buttons down, the module rescales instead of scrolls.

```
if Secondary Pointer has grab button 218 down
    set grab_going_on to TRUE
    if primary pointer grab button 218 is down (test b_m)
        Rescale the application in x by (x_s–grab_origin.x)
            /(x_s–x_m) %
        Rescale the application in y by (Y_s–grab_origin.y)/(y_s–y_m) %
    else
        Scroll the application by (x_s–grab_origin.x, y_s–grab_origin.y)
    end if else
        set grab_going_on to FALSE end if set grab_origin
            to (x_s, y_s)
```

Rescale: shrinks or expand the representation of data on a main application area by a specified percentage.

Scroll: shifts upward, downward, left, or right the representation of data by a given distance.

Menu button 216 is linked to the clickaround module. This module essentially shows the palette when the button is depressed, and keeps track of the user's move of secondary pointer device 116. If the user releases the button over a tool, then this tool is activated.

```
if Secondary Pointer has menu button 216 down
    set clickaround_going_on to TRUE
    if palette is not shown
        if x_m>x_s
            Show Palette at (x_m+1 cm, y_m+1 cm)
        else Show Palette at (x_m−1 cm, y_m−1 cm)
        set click_origin to (x_s, y_s)
    end if
    if click_origin #(x_s, y_s)
        call Select Tool routine at (x_s, y_s)
        set click_origin to (x_s, y_s) else=
    if click_around_going_on and current_tool is not nil
        Activate current_tool
        Hide Palette
        set current_tool to nil
    end if
    set clickaround_going_on to FALSE end if
```

Show Palette: makes the palette visible, on top of the application data, at a given location of the screen.

Hide Palette: hides the representation of tools with the full display area showing only application data.

Activate tool: performs the operation specified by the tool, on the data handled by the application, or marks this tool as ready to operate on the application data. The tools can be:
1. modifiers, like a color palette which changes the current painting color: the operation performed on the data remains that of the current tool, but a parameter is changed.
2. contextual (modal) tools (e.g., a brush tool or an eraser tool): the operation performed in the data changes.
3. "two-handed stretch" tools (e.g., a "rectangle creation" tool): the operation is a shape creation performed with either one or two hands.
4. "full" clickaround tools (e.g., a "copy-shape" or "paste-shape" tool): The operation of the tool requires a parameter (object of the application or position) that is determined by the position of the primary cursor.

Marking menu button 220 is linked to the marking menus module, as shown below. This module sets a variable stating that marking menus should be activated, if the user presses a button on primary pointer device 114.

```
if Secondary Pointer has marking menu button 220 down
    set mm_going_on to TRUE else
    set mm_going_on to FALSE end if
```

Pseudo-code for Select Tool Routine

This routine, shown below, is called each time the user moves secondary pointer device 116 while the menu button 216 is depressed. It handles the user feedback, stating which tools are ready to be activated.

```
if (x_s, y_s) is inside the rectangle delimiting a tool
    and that tool is not the current_tool
    if current_tool is not nil
        Unhilight current_tool
    set current_tool to the tool underlying (x_s, y_s)
    Highlight current_tool
    play a warning "change target" sound (optional) else
if (x_s, y_s) is not inside the rectangle delimiting a
    tool
    if current tool is not nil
        Unhilight current_tool
    Show a cursor at (x_s, y_s)
    play a warning "off target" sound (optional)
end if end if
```

Highlight tool: modifies the representation of the tool in a way the user can perceive that it is currently ready to be activated.

Unhilight tool: modifies the representation of the tool in a way the user can perceive that it is currently not ready to be activated.

Show a cursor: presents an image on the palette showing the current position of a pointer relative to that of the screen.

Pseudo-code for the Primary Pointer Dispatch Routine

This routine, as shown below, handles all events generated by the user's activation of primary pointer device 114. Most applications using a GUI utilize a similar routine; however, it is extended to handle several aspects of clickaround tools. For example, the primary cursor not only activates a tool, but also sets the relative position of the secondary cursor (setting click_origin), so that subsequent moves of the left hand pointers offset from the current position of the primary pointer instead of "jumping" back and forth between the actual secondary pointer position and the primary pointer location. Hence, the position of the primary pointer predominates over the moves of the secondary pointer.

In addition, the action of the primary cursor can be affected by the state of the secondary pointer buttons; if grab_going_on or mm_going_on are true (set by secondary pointer events), then the effect of the primary cursor moves are affected.

```
if Primary Pointer is over Palette window
    if Primary Pointer has grab button 218 down
        if (x_13 m, y_13 m) is over a tool
            if current_13 tool is not null
                Unhilight current_13 tool
            end if
            Highlight tool under Primary pointer
        end if
    else
        if current— tool is not nil
            Unhilight current_13 tool
        end if
        set current_13 tool to the tool under (x_13 m, y_13 m)
        Activate current_13 tool under (x_13 m, y_13 m)
    end if
    set click_13 origin to (x_13 m, y_13 m) else
    if Primary Pointer has grab button 218 down
        if mm_13 going_13 on is TRUE
            call Marking Menus display routine
        end if
        if grab_13 going_13 on is TRUE
            Rescale the application in x by (x_13 m-
                grab_13 origin_13 m.x)/(x_13 s − x_13 m) %
            Rescale the application in y by (y_13 m -
                grab_13 origin_13 m.y)/(y_13 s − y_13 m) %
            set grab_13 origin_13 m to (x_13 m, y_13 m)
        end if
        if current_13 tool is not nil
            Use current_13 tool
        end if
    else
        if mm_13 going_13 on is TRUE
            call Marking Menus activate routine
        end if
        if current_13 tool is not nil
            Stop using current_13 tool
        end if
    end if end if
```

Use tool: perform the operation described by this tool on the selected data or the data under the primary pointer. This routine is identical to those found on any GUI program that uses tools, except for "two-handed stretch," which need to also handle movement of secondary pointer device 116.

Stop using tool: if the operation of the tool works in a continuous fashion, stop this operation. This is similar to the conventional tools used in current GUI applications.

Other Embodiments

In one embodiment, the present invention may be implemented as a computer program product (e.g., a floppy disk, compact disk, etc.) comprising a computer readable medium having control logic recorded thereon to implement the features of the invention as described in relation to the other preferred embodiments. With reference to FIG. 1, the control logic, when loaded into memory 110 and executed by the CPU 108, enables the CPU 108 to perform the operations described herein. In this embodiment, the control logic represents a controller of CPU 108 during execution.

While the present invention has been particularly shown and described with reference to several preferred embodiments thereof, it will be apparent to a person skilled in the relevant art that various changes in form and details may be made therein without departing from the spirit and scope of the invention as defined in the appended claims.

What is claimed is:

1. A system having a graphical user interface in which objects are displayed thereon, wherein a user interacts with the objects using a primary device to control a primary cursor and a secondary device to control a secondary cursor, the system comprising:

receiving means for receiving information from the primary device and secondary device, wherein said information includes event actuation data and cursor position data; and clickaround tool means for displaying a tool palette having representative tool images in response to an actuation of the secondary device and activating an operation of a selected tool, wherein said clickaround tool means utilizes said cursor position data to display said tool palette with an offset position from the primary cursor and said event actuation data to display said tool palette only while the secondary device is actuated.

2. The system according to claim 1, wherein said actuation of the secondary device is initiated by depressing a menu button.

3. The system according to claim 1, wherein said clickaround tool means utilizes said cursor position data and event actuation data from said primary device to select and activate said selected tool, whereby the user indicates said selected tool by positioning the primary cursor on an image of said selected tool and actuates the primary device.

4. The system according to claim 1, wherein said clickaround tool means utilizes said cursor position data and event actuation data from said secondary device to select and activate said selected tool, whereby the user indicates said selected tool by positioning the secondary cursor on an image of said selected tool and deactuates the secondary device.

5. The system according to claim 4, wherein said tool images are positioned around the center of said tool palette for tool selection by the user by moving the secondary device angularly.

6. The system according to claim 1, further comprising two-handed means for displaying a second tool palette having second representative tool images in response to a second actuation of the secondary device and activating a second operation of a second selected tool in response to an actuation of the primary device, wherein upon a deactuation of the primary device said second tool palette disappears and a ghost shape image is displayed, whereby the user utilizes the primary and secondary cursors to size said ghost shape and wherein said second operation is performed upon a deactivation of the secondary device.

7. The system according to claim 1, further comprising leap-frog menu means moving said tool palette with a single leap toward the secondary cursor when the secondary cursor is moved a substantial distance from said tool palette.

8. The system according to claim 1, further comprising grab means for attaching the secondary cursor to one of the displayed objects and moving said one of the displayed objects in accordance with movements of the secondary device.

9. The system according to claim 1, further comprising marking menu means for interpreting at least some of said information from the primary device to control a marking menu.

10. The system according to claim 1, further comprising adjusting means for automatically adjusting dominant control, wherein a side of the primary cursor in which said tool palette is displayed is governed by a relative position of the secondary cursor, wherein if the secondary cursor is approximately left of the primary cursor, said tool palette is displayed left of the primary cursor and if the secondary cursor is right of the primary cursor, said tool palette is positioned right of the primary cursor.

11. The system according to claim 1, further comprising audio feedback means for issuing a first audible sound when the secondary cursor position is moved from one of said tool images to another of said tool images and a second audible sound when the secondary cursor is positioned off said tool palette.

12. The system according to claim 1, wherein said click-around means is incorporated into an operating system graphical user interface, thereby providing the features of the invention across a plurality of application programs.

13. The system according to claim 1, wherein said tool palette is semi-transparent.

14. A computer program product to interact with a graphical user interface having objects displayed thereon, wherein a user interacts with the objects using a primary device to control a primary cursor and a secondary device to control a secondary cursor, the computer program product comprising:

a computer usable medium having a computer readable program code means embodied in said medium for enabling the computer system to clickaround tools, said computer readable program code means comprising:

computer readable first program code means for enabling the computer system to receive information from the primary device and secondary device, wherein said information includes event actuation data and cursor position data; and computer readable second program code means for enabling the computer system to display a tool palette having representative tool images in response to actuation of the secondary device and activate an operation of a selected tool, wherein said computer readable second program code means utilizes said cursor position data to display said tool palette with an offset position from the primary cursor and said event actuation data to display said tool palette only while the secondary device is actuated.

15. The computer program product according to claim 14, wherein said computer readable second program code means utilizes said cursor position data and event actuation data from said primary device to select and activate said selected tool, whereby the user indicates said selected tool by positioning the primary cursor on an image of said selected tool and actuates the primary device.

16. The computer program product according to claim 14, further comprising computer readable third program code means for enabling the computer system to display a second tool palette having second representative tool images in response to a second actuation of the secondary device and activating a second operation of a second selected tool in response to an actuation of the primary device, wherein upon a deactuation of the primary device said second tool palette disappears and a ghost shape image is displayed, whereby the user utilizes the primary and secondary cursors to size said ghost shape and wherein said second operation is performed upon a deactivation of the secondary device.

17. The computer program product according to claim 14, further comprising: computer readable fourth program code means for enabling the computer system movies aid tool palette with a single leap toward the secondary cursor when the secondary cursor is moved a substantial distance from said tool palette.

18. The computer program product according to claim 14, further comprising computer readable fifth program code means for enabling the computer system to automatically adjust dominant control, wherein a side of the primary cursor in which said tool palette is displayed is governed by a relative position of the secondary cursor, wherein if the secondary cursor is approximately left of the primary cursor, said tool palette is displayed left of the primary cursor and if the secondary cursor is right of the primary cursor, said tool palette is positioned right of the primary cursor.

19. The computer program product according to claim 14, further comprising computer readable sixth program code means for enabling the computer system to issue a first audible sound when the secondary cursor position is moved from one of said tool images to another of said tool images and a second audible sound when the secondary cursor is positioned off said tool palette.

20. A method of providing user interaction with a graphical user interface with objects displayed thereon, wherein a user interacts with the objects using a primary device to control a primary cursor and a secondary device to control a secondary cursor, the method comprising steps of:

displaying a tool palette having representative tool images in response to an actuation of the secondary device; and activating an operation of a selected tool, wherein said tool palette is displayed with an offset position from the primary cursor and said tool palette is only displayed while the secondary device is actuated.

* * * * *